United States Patent
Maki

(10) Patent No.: US 10,903,628 B2
(45) Date of Patent: Jan. 26, 2021

(54) METHOD FOR MANUFACTURING SPARK PLUG

(71) Applicant: NGK Spark Plug Co., Ltd., Nagoya (JP)

(72) Inventor: Shunsuke Maki, Konan (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 0 days.

(21) Appl. No.: 16/635,679

(22) PCT Filed: May 30, 2018

(86) PCT No.: PCT/JP2018/020721
§ 371 (c)(1),
(2) Date: Jan. 31, 2020

(87) PCT Pub. No.: WO2019/049440
PCT Pub. Date: Mar. 14, 2019

(65) Prior Publication Data
US 2020/0366068 A1    Nov. 19, 2020

(30) Foreign Application Priority Data

Sep. 6, 2017   (JP) .................................. 2017-171079

(51) Int. Cl.
*H01T 21/02* (2006.01)
*B23K 26/21* (2014.01)
(Continued)

(52) U.S. Cl.
CPC .............. *H01T 21/02* (2013.01); *B23K 26/21* (2015.10); *B23K 26/351* (2015.10);
(Continued)

(58) Field of Classification Search
CPC ............................. B23K 26/355; H01T 21/02
(Continued)

(56) References Cited

U.S. PATENT DOCUMENTS

| 5,563,468 A * | 10/1996 | Abe ........................ H01T 13/39 |
| | | 313/141 |
| 6,676,468 B2 | 1/2004 | Ishiguro et al. |
| 2011/0148275 A1* | 6/2011 | Taido ...................... H01T 13/39 |
| | | 313/141 |

(Continued)

FOREIGN PATENT DOCUMENTS

| JP | 52-149353 A | 12/1977 |
| JP | 2002-141154 A | 5/2002 |

(Continued)

OTHER PUBLICATIONS

International Search Report from corresponding International Patent Application No. PCT/JP2018/020721, dated Aug. 21, 2018.

(Continued)

*Primary Examiner* — Christopher M Raabe
(74) *Attorney, Agent, or Firm* — Kusner & Jaffe

(57) ABSTRACT

The present invention provides a method of manufacturing a spark plug which is capable of securing a bonding strength at the middle of a chip while suppressing an occurrence of scattering. The method of manufacturing the spark plug having a ground electrode to which a bonding surface of a chip is welded, has a machining process of machining the ground electrode such that an area located inside an edge of a welding-planned part where the chip is welded on the ground electrode and including a center of the welding-planned part is rougher than a section except the area of the welding-planned part, and a bonding process of bonding the chip to the welding-planned part of the ground electrode after undergoing the machining process by resistance welding.

8 Claims, 6 Drawing Sheets

(51) Int. Cl.
*B23K 26/352* (2014.01)
*H01T 13/32* (2006.01)
*B23K 26/351* (2014.01)
*B23K 101/36* (2006.01)

(52) U.S. Cl.
CPC ............ *B23K 26/355* (2018.08); *H01T 13/32* (2013.01); *B23K 2101/36* (2018.08)

(58) Field of Classification Search
USPC ........................................................... 445/7
See application file for complete search history.

(56) References Cited

U.S. PATENT DOCUMENTS

2018/0331511 A1* 11/2018 Maki ................ G06K 19/06046
2019/0044310 A1*  2/2019 Maki .................... B23K 26/359
2019/0334323 A1* 10/2019 Shimamura ............. H01T 21/02
2019/0363521 A1* 11/2019 Maki ........................ H05K 3/40

FOREIGN PATENT DOCUMENTS

JP      2003-123937 A    4/2003
JP      2003-229230 A    8/2003

OTHER PUBLICATIONS

Japanese Office Action issued in connection with corresponding JP 2017-171079, dated Aug. 16, 2018.
Japanese Office Action issued in connection with corresponding JP 2017-171079, dated Feb. 28, 2019.

* cited by examiner

METHOD FOR MANUFACTURING SPARK PLUG

TECHNICAL FIELD

The present invention relates to a method for manufacturing a spark plug, and more particularly to a method for manufacturing a spark plug in which a chip is bonded to a ground electrode by resistance welding.

BACKGROUND ART

To improve spark wear resistance, a spark plug in which a chip containing noble metal is bonded to a ground electrode is known. One of methods for bonding the chip to the ground electrode is resistance welding. Patent Document 1 discloses a technique in which after roughening, by grinding, a surface of the ground electrode to which the chip is bonded, the chip is placed on the surface of the ground electrode and sandwiched between electrodes, and by passing current through the electrodes, resistance-heating occurs, then a nugget formed by melt and solidification of the chip and the ground electrode is formed. In Patent Document 1, by increasing roughness of an entire contact surface of the ground electrode with the chip, a contact resistance between the chip and the ground electrode is increased and a heat value is increased, then the nugget is formed.

CITATION LIST

Patent Document

Patent Document 1: Japanese Unexamined Patent Application Publication No. JP2003-123937

SUMMARY OF THE INVENTION

Technical Problem

In the case of the above conventional technique, however, since the current flowing through the electrodes expands or spreads once in bonding members (the chip and the ground electrode) due to a fringing phenomenon, a current density increases at an edge part of the contact surface where the chip and the ground electrode contact each other. As a result, since temperature of the bonding members starts to rise from the edge part of the chip and a melting area extends from this edge part of the chip, a bonding strength at a middle of the chip might be lower than that in the vicinity of the edge part of the chip.

On the other hand, in order to secure the bonding strength at the middle of the chip, if the heat value is further increased by increasing an amount of current application between the electrodes, the bonding members are locally overheated, and scattering of molten metal (so-called scattering) is likely to occur, then variations in nugget diameter and contamination around the chip are likely to occur.

The present invention was made in order to solve the above problem. An object of the present invention is therefore to provide a method of manufacturing the spark plug which is capable of securing the bonding strength at the middle of the chip while suppressing the occurrence of the scattering.

Solution to Problem and Effects of Invention

In order to achieve the object, a method of manufacturing a spark plug having a ground electrode to which a bonding surface of a chip is welded, comprises: a machining process of machining the ground electrode such that an area located inside an edge of a welding-planned part where the chip is welded on the ground electrode and including a center of the welding-planned part is rougher than a section except the area of the welding-planned part; and a bonding process of bonding the chip to the welding-planned part of the ground electrode having undergone the machining process by resistance welding.

Further, a method of manufacturing a spark plug having a ground electrode to which a bonding surface of a chip is welded, comprises: a machining process of machining the chip such that an area located inside an edge of the bonding surface of the chip and including a center of the bonding surface is rougher than a section except the area of the bonding surface; and a bonding process of bonding the bonding surface of the chip having undergone the machining process to a welding-planned part where the chip is welded on the ground electrode by resistance welding.

Effects of Invention

According to the method of manufacturing the spark plug recited in claim 1, by the machining process, the area located inside the edge of the welding-planned part where the chip is welded on the ground electrode and including the center of the welding-planned part is machined so as to be rougher than the section except the area of the welding-planned part. Further, by the bonding process, the chip is bonded to the welding-planned part of the ground electrode having undergone the machining process by resistance welding. In the bonding process, in an early current application, a density of current passing through the roughly-machined area including the center of the welding-planned part and the chip can be high as compared with that in its vicinity. It is consequently possible to increase temperature of bonding members (the chip and the ground electrode) from the area including the center of the welding-planned part and extend a melting area without increasing an amount of current flowing through electrodes. Therefore, an occurrence of scattering can be suppressed, and a bonding strength at the middle of the chip can be secured.

According to the method of manufacturing the spark plug recited in claim 2, by the machining process, the area located inside the edge of the bonding surface of chip and including the center of the bonding surface is machined so as to be rougher than the section except the area of the bonding surface. Further, by the bonding process, the bonding surface of the chip having undergone the machining process is bonded to the welding-planned part where the chip is welded on the ground electrode by resistance welding. In the bonding process, in an early current application, a density of current passing through the roughly-machined area including the center of the chip and the ground electrode can be high as compared with that in its vicinity. It is consequently possible to increase temperature of bonding members (the chip and the ground electrode) from the area including the center of the chip and extend a melting area without increasing the amount of current flowing through electrodes. Therefore, an occurrence of scattering can be suppressed, and a bonding strength at the middle of the chip can be secured.

According to the method of manufacturing the spark plug recited in claim 3, when dividing the area into two of the first portion at the side of the one end portion and the second portion at the side of the other end portion by the plane that is perpendicular to the axis extending from the one end portion toward the other end portion of the ground electrode whose one end portion is connected to the metal shell and whose other end portion is provided with the welded the chip and passes through the center of the welding-planned part or the center of the bonding surface having undergone the bonding process, the area of the first portion is greater than that of the second portion. It is consequently possible to increase the temperature of the bonding members (the chip and the ground electrode) from the first portion located at the side of the one end portion, connected to the metal shell, of the ground electrode and extend the melting area. Since a cross section, at the one end portion side, of a nugget, which is close to the metal shell and thus hard to increase an amount of heat when performing the resistance welding, can be easily secured, in addition to an effect of the claim 1 or 2, a bonding strength of the first portion (at the one end portion side of the ground electrode) can be secured.

According to the method of manufacturing the spark plug recited in claim 4, by the first process of the machining process, the area is roughened by irradiating the area with laser beam, and by the second process of the machining process, the oxide film formed in the first process is removed by irradiating the oxide film with laser beam having a smaller power than that in the first process. Therefore, in addition to the effect of anyone of claims 1 to 3, the oxide film hardly affects a behavior of forming and growth of the nugget in the bonding process.

According to the method of manufacturing the spark plug recited in claim 5, when undergoing the bonding process, at least the welding-planned part on the ground electrode has no plating layer on the welding-planned part. This therefore prevents the plating layer from being melted before the ground electrode is melted. Thus, in addition to the effect of any one of claims 1 to 4, the plating layer does not affect the behavior of forming and growth of the nugget.

EMBODIMENTS FOR CARRYING OUT THE INVENTION

Figure 1:
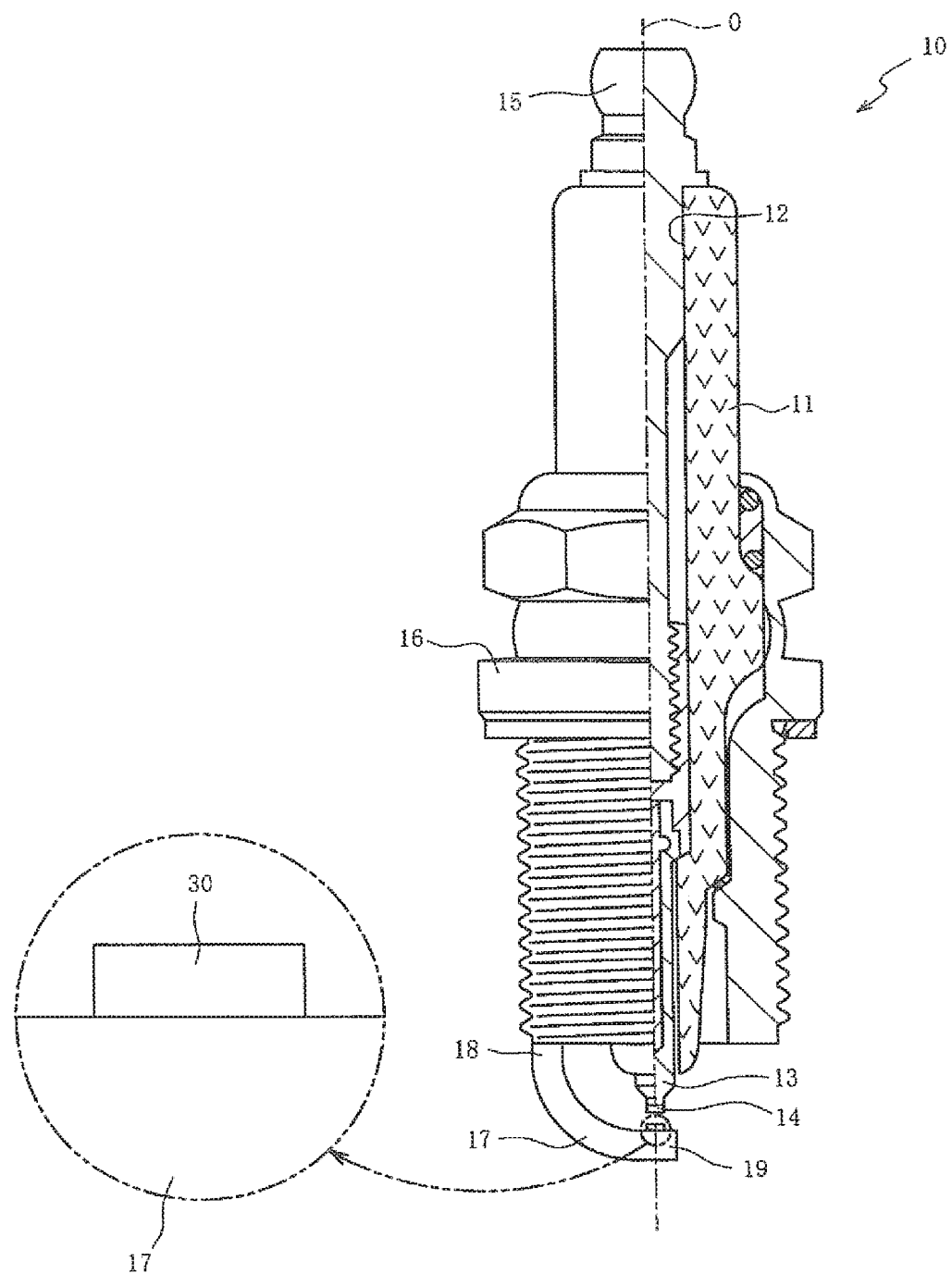
FIG. 1 is a one side cross section of a spark plug according to an embodiment of the present invention.

Preferred embodiments of the present invention will be explained below with reference to the drawings. FIG. 1 is a one side cross section of a spark plug 10 according to an embodiment of the present invention. In FIG. 1, a lower side of the drawing is called a top end side of the spark plug 10, and an upper side of the drawing is called a rear end side of the spark plug 10. The spark plug 10 has an insulator 11, a metal shell 16 and a ground electrode 17.

The insulator 11 is a cylindrical tubular member made of alumina etc. which is superior in mechanical characteristics and insulation performance under high temperature. The insulator 11 is provided with an axial hole 12 that penetrates the insulator 11 along an axis O. A center electrode 13 is set at a top end side in the axial hole 12.

The center electrode 13 is a rod-shaped member extending along the axis O. A core, made of or principally made of copper, of the center electrode 13 is covered with nickel or nickel-base alloy. The center electrode 13 is supported by the insulator 11, and its tip is exposed from the axial hole 12. A chip 14 containing noble metal is bonded to the tip of the center electrode 13.

A metal terminal 15 is a rod-shaped member to which a high-tension cable (not shown) is connected. The metal terminal 15 is made of metal material (e.g. low-carbon steel) having conductivity. The metal terminal 15 is fixed to a rear end of the insulator 11 with a top end side of the metal terminal 15 inserted into the axial hole 12 of the insulator 11. The metal shell 16 is secured onto an outer periphery of the insulator 11.

The metal shell 16 is a substantially cylindrical tubular member made of metal material (e.g. low-carbon steel) having conductivity. The ground electrode 17 is connected to a top end portion of the metal shell 16. The ground electrode 17 is a metal-made (e.g. nickel-base alloy-made) rod-shaped member to which a chip 30 containing noble metal is bonded. One end portion 18 of the ground electrode 17 is connected to the metal shell 16, and the chip 30 is welded to the other end portion 19 of the ground electrode 17. In the present embodiment, the other end portion 19 side of the ground electrode 17 is bent or curved. Between the chip 30 bonded to the other end portion 19 of the ground electrode 17 and the center electrode 13 (the chip 14), a spark gap is formed.

The spark plug 10 is manufactured, for instance, by the following method. First, the center electrode 13 provided with the chip 14 previously bonded to the tip thereof is inserted into the axial hole 12 of the insulator 11, and is set so that the tip of the center electrode 13 is exposed from the axial hole 12 to the outside. After the metal terminal 15 is inserted into the axial hole 12 and electric conduction between the metal terminal 15 and the center electrode 13 is secured, the metal shell 16 to which the ground electrode 17 is previously connected is secured to the outer periphery of the insulator 11. After the chip 30 is bonded to the other end portion 19 of the ground electrode 17 by resistance welding, by bending or curving the ground electrode 17 so that the chip 30 faces the center electrode 13 (the chip 14), the spark plug 10 is obtained.

Figure 2:
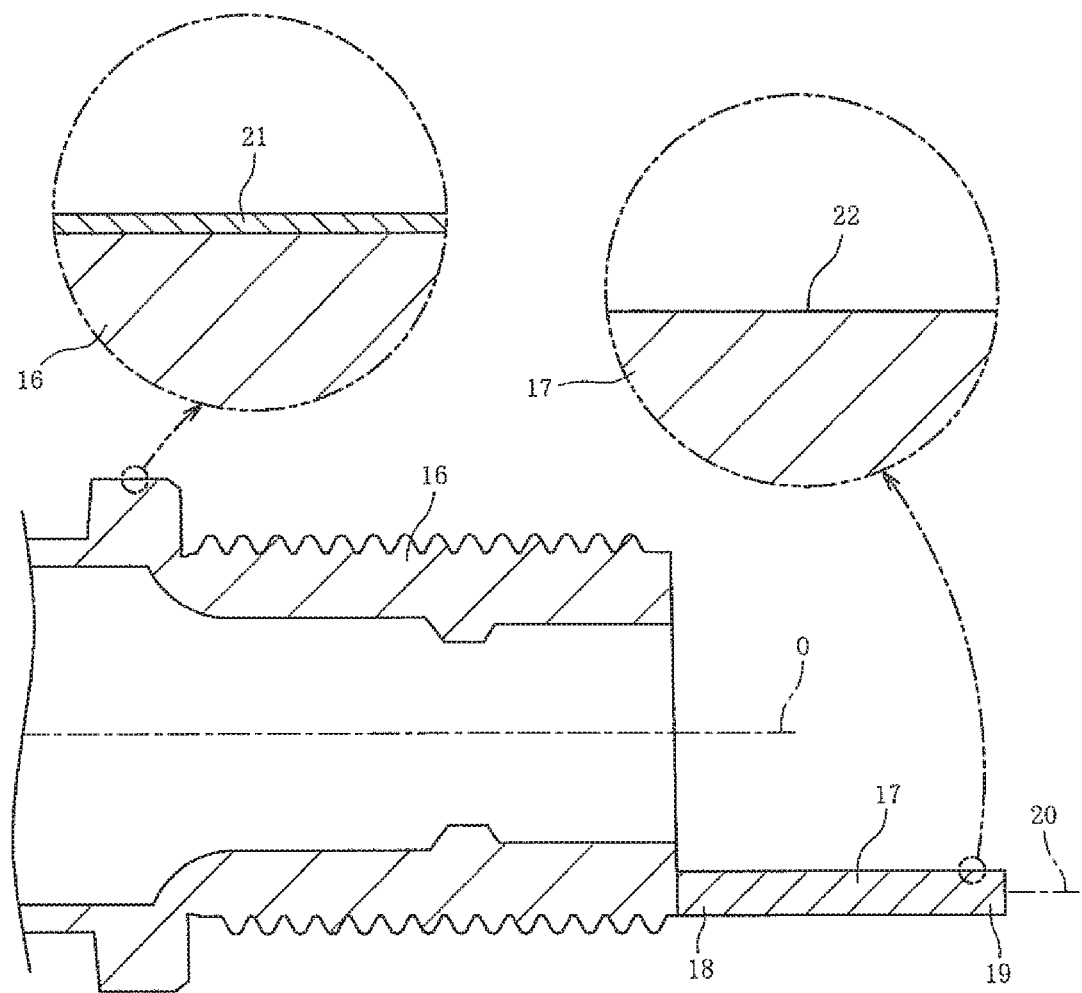
FIG. 2 is a cross section of a metal shell and a ground electrode.

A method of bonding the chip 30 to the ground electrode 17 will be explained with reference to FIGS. 2 to 5. First, the ground electrode 17 before the chip 30 is bonded will be explained with reference to FIGS. 2 to 4. FIG. 2 is a cross section of the metal shell 16 and the ground electrode 17, including the axis O. FIG. 2 depicts a state before the metal shell 16 is secured to the insulator 11 and before the ground electrode 17 is bent. The ground electrode 17 before the chip 30 is bonded is formed into a linear shape along an axis 20 that extends from the one end portion 18 toward the other end portion 19. The ground electrode 17 of FIG. 2 is illustrated as a cross section cut by a cutting surface including the axis 20.

As shown in FIG. 2, a plating layer 21 is formed on a surface of the metal shell 16 to which the ground electrode 17 is connected. The plating layer 21 is a surface treatment layer for mainly improving corrosion resistance of the metal shell 16. The plating layer 21 is principally made of e.g. zinc, chromate-treated zinc or nickel. The plating layer 21 is formed on the metal shell 16 to which the ground electrode 17 is connected, by barrel plating.

By this plating, the plating layer 21 is formed not only on the surface of the metal shell 16, but also on a surface of the ground electrode 17. If the chip 30 is resistance-welded to the plating layer 21 formed on the surface of the ground electrode 17, since the plating layer 21 is melted before the ground electrode 17 is melted, the plating layer 21 affects welding quality of the chip 30. In the present embodiment, in order to eliminate the need to take the melt of the plating layer 21 into consideration at the resistance welding, the plating layer 21 of at least a welding-planned part 22 where the chip 30 is welded is removed. The plating layer 21 is partly removed by a physical removing method such as ion etching and shot blasting or a chemical removing method such as soaking of the ground electrode 17 in stripping solution.

Although the plating layer 21 of at least the welding-planned part 22 of the ground electrode 17 has to be removed, as a matter of course, the plating layer 21 formed on the same surface as the welding-planned part 22 could be removed widely to the vicinity of the metal shell 16. In this case, it is preferable to remove the plating layer 21 of the ground electrode 17 up to a position that is beyond a bending part of the ground electrode 17 bending toward the center electrode 13. If the ground electrode 17 is bent toward the center electrode 13 with the plating layer 21 forming or remaining on the ground electrode 17, there is a risk that a part of the plating layer 21 will come off by the bending. Then, a spark discharge occurs between a part where the plating layer 21 comes off and the center electrode 13, and ignitability may be deteriorated. By removing the plating layer 21 of the bending part of the ground electrode 17, this problem can be suppressed.

Figure 3:
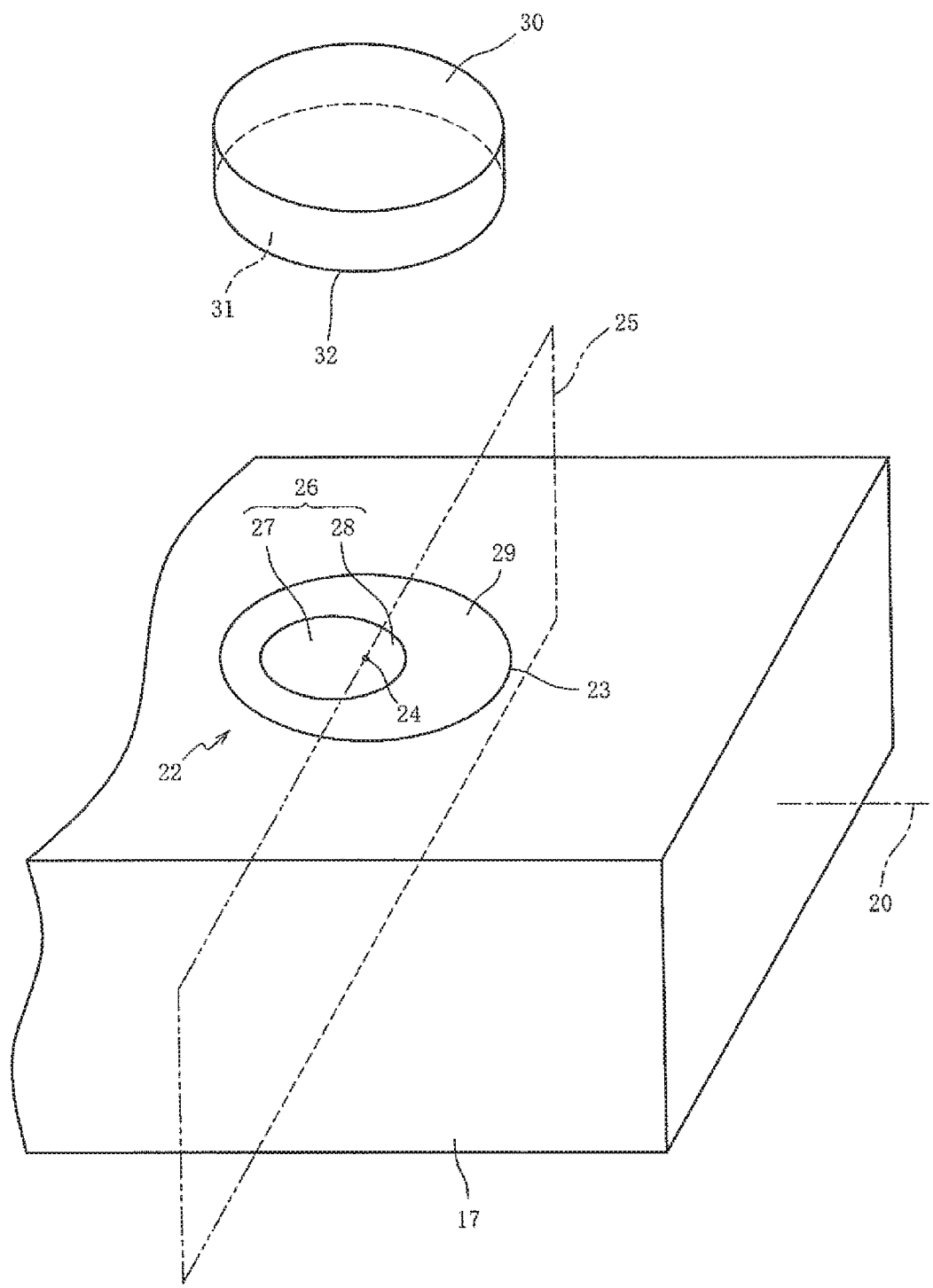
FIG. 3 is a perspective view of a chip and the ground electrode after machining process according to a first embodiment of the present invention.

FIG. 3 is a perspective view of the chip 30 and the ground electrode 17 after machining process according to a first embodiment. The machining process is a process that increases a surface roughness of a part of the welding-planned part 22 where the chip 30 is going to be welded. The welding-planned part 22 is a section against which a bonding surface 31 of the chip 30 is pressed on the ground electrode 17 at the resistance welding. Therefore, the welding-planned part 22 has the same size and the same shape as those of the bonding surface 31 of the chip 30. In the present embodiment, the chip 30 has a disk shape, and the welding-planned part 22 is circular in shape.

In the machining process, the welding-planned part 22 is machined such that an area 26 located inside an edge 23 of the welding-planned part 22 and including a center 24 of the welding-planned part 22 is coarser or rougher than a section 29 except the area 26 of the welding-planned part 22. In the present embodiment, a shape of the area 26 is similar to that of the bonding surface 31 of the chip 30. As a method of roughening the area 26, it is deformation processing (or plastic working) using a transfer mold, grinding, electrical discharge machining, blasting, peening, laser beam irradiation or electron beam irradiation, and etching. In the present embodiment, a case where the area 26 is roughened by being irradiated with the laser beam, which facilitates micromachining and can be treated in the atmosphere, will be explained.

When dividing the area 26 into two by a plane 25 that is perpendicular to the axis 20 of the ground electrode 17 and passes through the center 24 of the welding-planned part 22, one of the two is a first portion 27 at a side of the one end portion 18 connected to the metal shell 16 (see FIG. 2), and the other is a second portion 28 at a side of the other end portion 19 (see FIG. 2). A location of the area 26 with respect to the center 24 of the welding-planned part 22 is set such that an area of the first portion 27 is greater than that of the second portion 28.

Figure 4A:
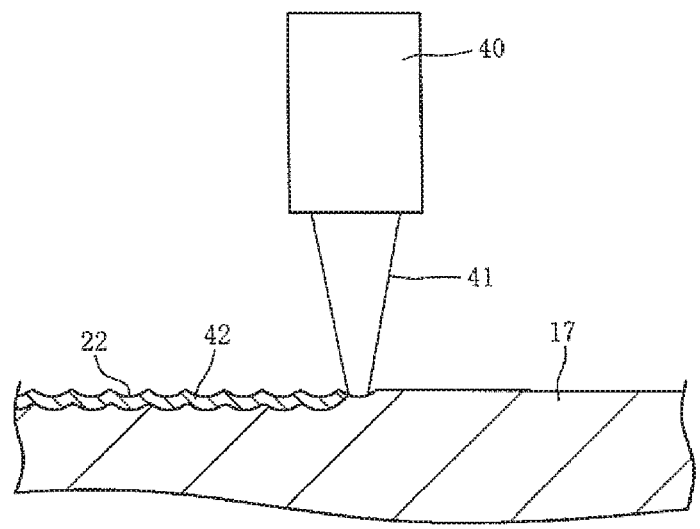
FIG. 4A is a cross section of the ground electrode in a first process of the machining process.
Figure 4B:
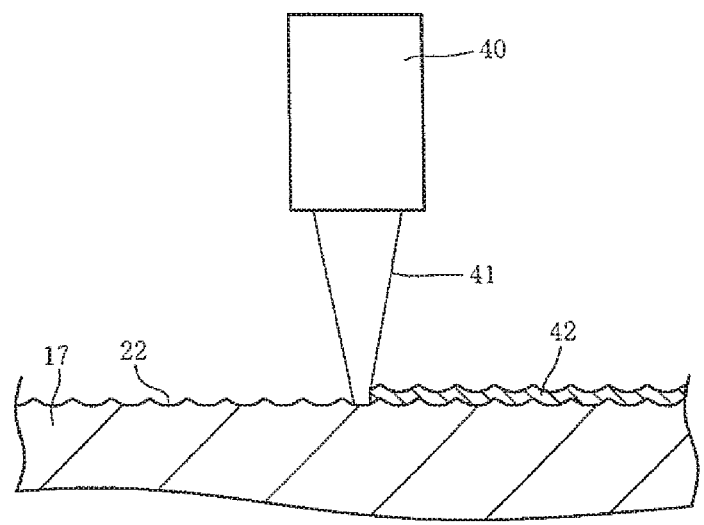
FIG. 4B is a cross section of the ground electrode in a second process of the machining process.

FIG. 4A is a cross section of the ground electrode 17 in a first process of the machining process. FIG. 4B is a cross section of the ground electrode 17 in a second process of the machining process. In the first process shown in FIG. 4A, the welding-planned part 22 of the ground electrode 17 is irradiated with laser beam 41 from an irradiating head 40. By the welding-planned part 22 being irradiated with the laser beam 41, the welding-planned part 22 is partly melted and recessed or hollowed, and a liquid phase is formed. Since the laser beam 41 moves along the welding-planned part 22, the liquid phase flows (or is fluidized) and solidifies by an action of surface tension, and asperities (an uneven surface, projections and depressions) where the recesses continue are formed. With this, a surface roughness of the area 26 (see FIG. 3), which is a part of the welding-planned part 22, can be increased. Depending on a power of the laser beam 41, an oxide film 42 is formed on the uneven surface.

In the second process shown in FIG. 4B, by irradiating the oxide film 42 with the laser beam 41 having a smaller power than that in the first process, the oxide film 42 formed in the first process is melted or sublimated with the surface roughness by the first process remaining, and the oxide film 42 formed on the welding-planned part 22 is removed. As the laser beam 41, pulse wave laser and continuous wave laser can be used.

Figure 5:
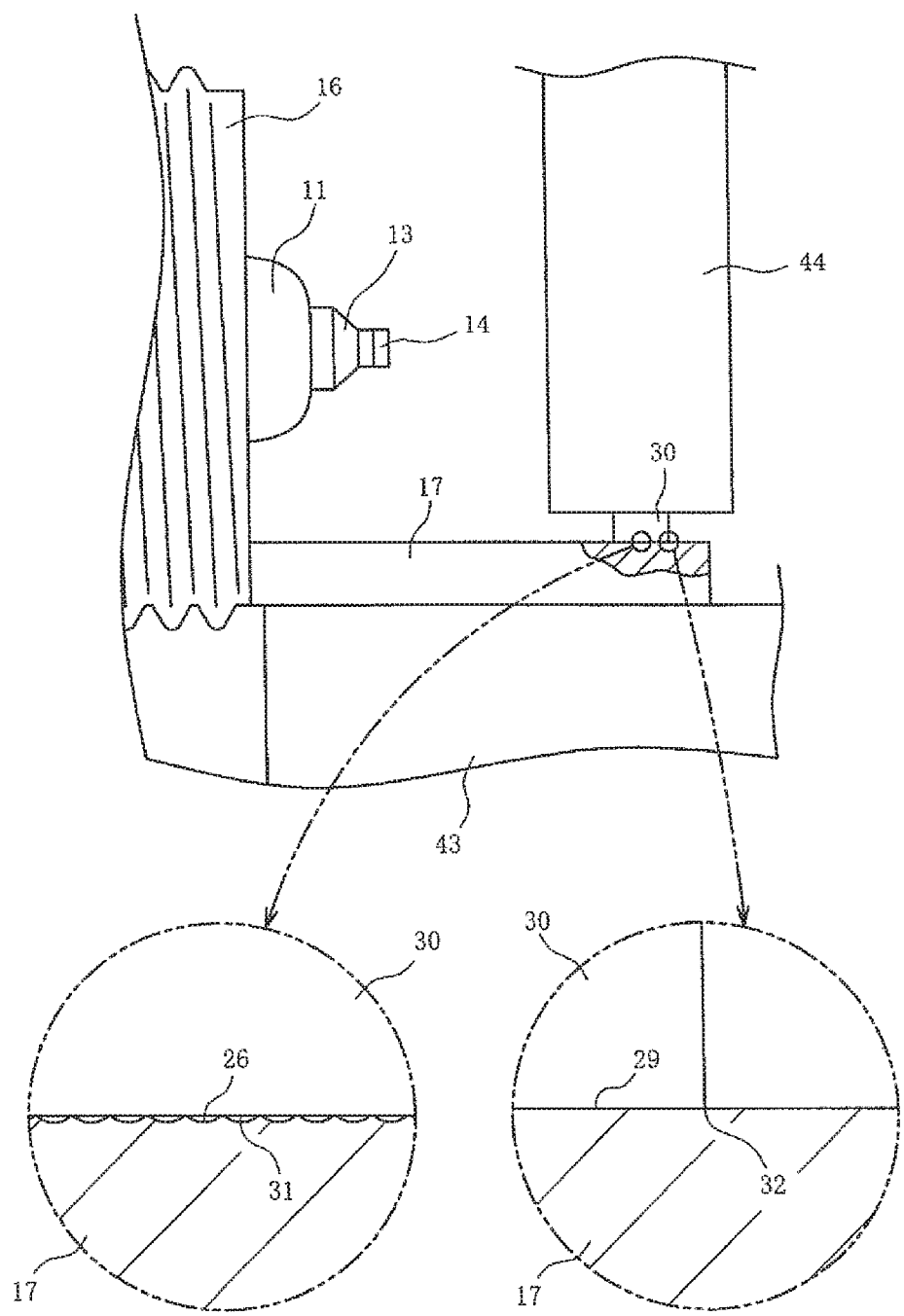
FIG. 5 is a drawing showing a side view of the chip and the ground electrode sandwiched between electrodes.

The resistance welding of the ground electrode 17 undergoing the machining process and the chip 30 will be explained with reference to FIG. 5. FIG. 5 is a drawing showing a side view of the chip 30 and the ground electrode 17 sandwiched between electrodes (a first electrode 43 and a second electrode 44). In FIG. 5, a part of the ground electrode 17 is illustrated as a partial cross section cut by a cutting surface including the axis 20 (see FIG. 2).

As shown in FIG. 5, the ground electrode 17 is previously connected to the metal shell 16 secured onto the outer periphery of the insulator 11. In a bonding process, the chip 30 is placed on the welding-planned part 22 (see FIG. 3) of the ground electrode 17, and the ground electrode 17 and the chip 30 (hereinafter, called bonding members) are sandwiched between the first electrode 43 and the second electrode 44. Before current application, the bonding members are pressed by the first electrode 43 and the second electrode 44. After the pressing becomes stable, the current is applied between the first electrode 43 and the second electrode 44. Since current has a tendency to expand or spread once in the bonding members due to a fringing phenomenon, a current density tends to increase in the vicinities of the edge 23 of the welding-planned part 22 (see FIG. 3) and an edge 32 of the bonding surface 31 of the chip 30.

However, the ground electrode 17 undergoes the machining process such that the area 26 located inside the edge 23 of the welding-planned part 22 (see FIG. 3) and including the center 24 of the welding-planned part 22 is coarser or rougher than the section 29 except the area 26 of the welding-planned part 22. Therefore, a contact resistance of the area 26 can be higher than that of the section 29. As a consequence, in an early current application, the current density of the area 26 including the center 24 of the welding-planned part 22 increases, and temperature of the area 26 starts to rise. Subsequently, the temperature of the area 26 further increases, and temperature of the section 29 around the area 26 also increases. When temperatures of the area 26 and the section 29 exceed melting points of the bonding members, the bonding members start to be melted, and a melting area extends by and according to a charging amount of heat, i.e. with increase in an amount of current and a current application time. When stopping the current application, the melting area solidifies, and a nugget formed by melt and solidification of the chip 30 and the ground electrode 17 is formed.

Here, in the bonding process, as a pressing force exerted on the bonding members by the first electrode 43 and the second electrode 44 is increased, the bonding surface 31 of the chip 30 contacts the minute asperities formed in the area 26 of the ground electrode 17 more easily. Therefore, a contact area between the asperities of the area 26 and the bonding surface 31 is increased, and the current density decreases, then a heat value is decreased. To increase the heat value, it is required to increase the amount of current flowing through the first electrode 43 and the second electrode 44. Conversely, as the pressing force exerted on the bonding members by the first electrode 43 and the second electrode 44 is decreased, the contact area between the asperities of the area 26 and the bonding surface 31 is decreased, and the current density of the area 26 increases. Therefore, the heat value at the middle of the bonding surface 31 of the chip 30 is higher than that in its vicinity.

In the bonding process, by adjusting the pressing force exerted on the bonding members by the first electrode 43 and the second electrode 44, in the early current application, the density of the current passing through the roughly-machined area 26 including the center 24 of the welding-planned part 22 and the chip 30 can be high as compared with that in its vicinity. It is consequently possible to increase the temperature of the bonding members (the chip 30 and the ground electrode 17) from the area 26 including the center 24 of the welding-planned part 22 and extend the melting area without increasing the amount of current flowing through the first electrode 43 and the second electrode 44. Therefore, an occurrence of scattering (scattering of molten metal) can be suppressed, and a bonding strength at a middle of bonding surface 31 of the chip 30 can be secured.

If the bonding strength at the middle of bonding surface 31 of the chip 30 is lower than that in the vicinity of the edge 32 of the bonding surface 31, in a situation where the chip 30 has a large-sized side surface and wears due to the spark then the nugget also wears from its periphery, a cross section of the nugget is insufficient, then there is a risk that the chip 30 will fall off the ground electrode 17. In contrast to this, in the present embodiment, since the bonding strength at the middle of bonding surface 31 of the chip 30 can be secured, even when the chip 30 has the large-sized side surface and wears due to the spark, the cross section of the nugget can be secured. Therefore, falling-off of the chip 30 from the ground electrode 17 can be prevented.

In the machining process, the area 26 is formed in the welding-planned part 22 such that when divided into two by the plane 25 perpendicular to the axis 20 of the ground electrode 17 and passing through the center 24 of the welding-planned part 22, the area of the first portion 27 at the side of the one end portion 18, connected to the metal shell 16, of the ground electrode 17 is greater than that of the second portion 28 at the side of the other end portion 19. With this, in the bonding process, it is possible to increase the temperature of the bonding members (the chip 30 and the ground electrode 17) from the first portion 27 and extend the melting area. Since a cross section, at the one end portion 18 side, of the nugget, which is close to the metal shell 16 and thus hard to increase an amount of heat when performing the resistance welding, can be easily secured, a bonding strength of the first portion 27 (at the one end portion 18 side of the ground electrode 17) can be secured.

Since the shapes of the bonding surface 31 of the chip 30 and the area 26 are similar to each other, the nugget formed at the ground electrode 17 and the chip 30 (the bonding members) can be easily formed into a proper shape to the shape of the bonding surface 31 of the chip 30. With this, the bonding strength of the chip 30 can be easily secured.

In the machining process, the area 26 is roughened by being irradiated with the laser beam 41 by the first process, and the oxide film 42 formed in the first process is removed by being irradiated with the laser beam 41 having a smaller power than that in the first process by the second process. With this, the oxide film 42 affecting the contact resistance between the welding-planned part 22 of the ground electrode 17 and the bonding surface 31 of the chip 30 can be maintained at the same state through the processes. Since the surface roughness of the welding-planned part 22 by the first process is maintained in the second process, the contact resistance between the welding-planned part 22 of the ground electrode 17 and the bonding surface 31 of the chip 30 can be stable. This reduces an occurrence of variations in behavior of forming and growth of the nugget in the bonding process.

Since the plurality of asperities (the projections and the depressions) are formed in the area 26 and a size of one depression (one recess) is smaller than an area of the bonding surface 31 of the chip 30, when the chip 30 is placed on the welding-planned part 22, the plurality of projections contact the chip 30. When applying the pressing force to these chip 30 and welding-planned part 22 through the first electrode 43 and the second electrode 44, the projections are elastically deformed or plastically deformed, and a predetermined contact surface can be obtained. When passing the current through this portion through the first electrode 43 and the second electrode 44, the current concentratedly flows through the contact surface. Because a resistance of the contact surface is high as compared with those of other portions, the contact surface is heated and softens and is crushed, then a new contact surface is generated. Since the current is easy to flow through the new contact surface, the new contact surface is heated. Since the contact surface spreads while being heated and the melting area is formed in this manner, the occurrence of variations in behavior of forming and growth of the nugget in the bonding process can be reduced.

The plating layer 21 is not formed at least at the welding-planned part 22 on the ground electrode 17. This therefore prevents the plating layer 21 from being melted before the ground electrode 17 is melted at the welding-planned part 22. If the plating layer 21 is melted, the contact area is increased, and the current density decreases, then the heat value is decreased. This might cause the occurrence of variations in behavior of forming and growth of the nugget. In contrast to this, in the present embodiment, since the plating layer 21 is not formed at the welding-planned part 22, the plating layer 21 does not affect the behavior of forming and growth of the nugget.

Next, a second embodiment will be explained with reference to FIG. 6. In the first embodiment, the case where the surface roughness of a part of the welding-planned part 22 of the ground electrode 17 is increased is explained. In contrast to this, in the second embodiment, a case where a surface roughness of a part of a bonding surface 51 of a chip 50 is increased will be explained. The same element or component as that of the first embodiment is denoted by the same reference sign, and its explanation will be omitted.

Figure 6:
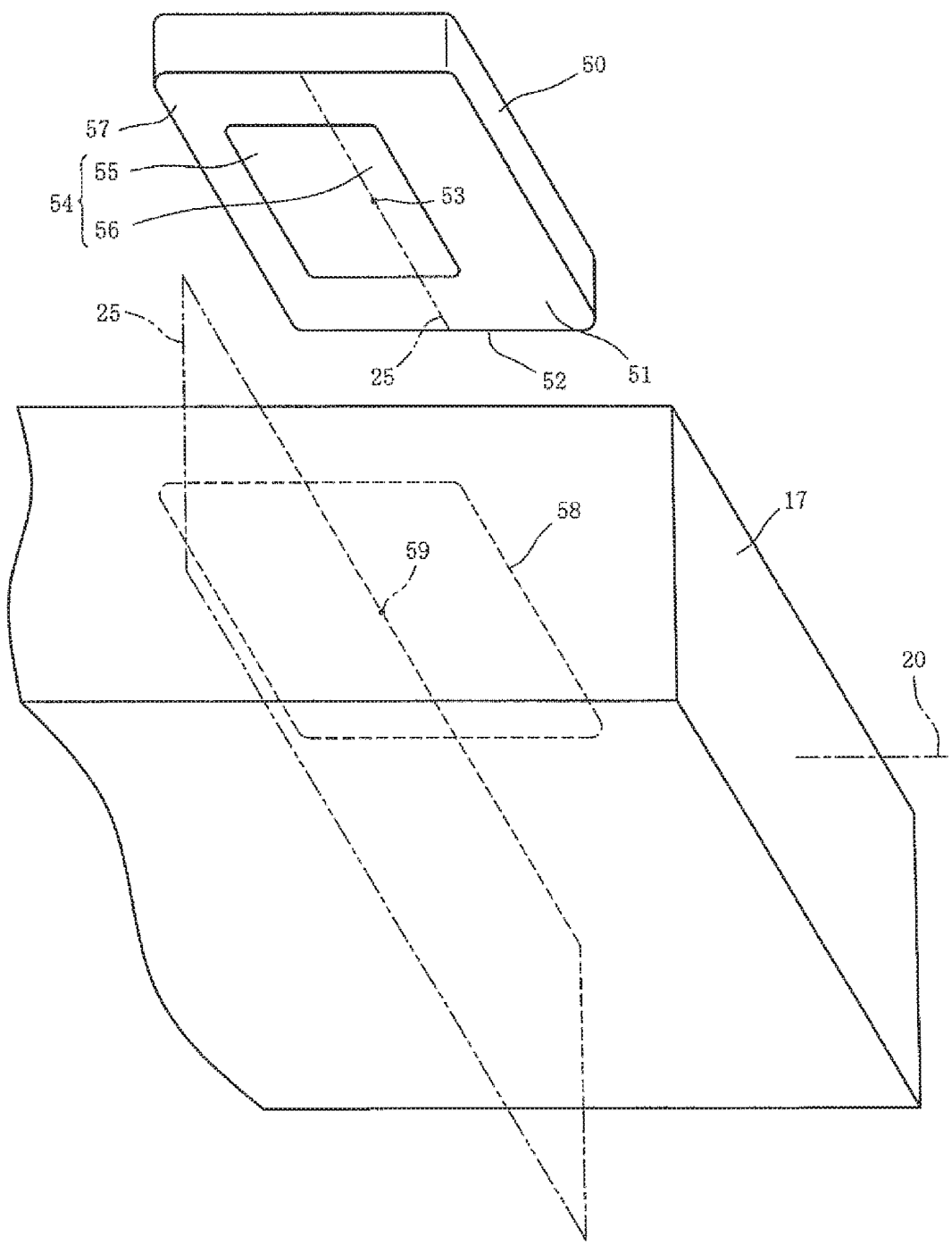
FIG. 6 is a perspective view of a chip and the ground electrode after machining process according to a second embodiment of the present invention.

FIG. 6 is a perspective view of the chip 50 and the ground electrode 17 after machining process according to the second embodiment.

As shown in FIG. 6, the chip 50 has a rectangular parallelepiped shape. The chip 50 contains noble metal. A machining process is a process that increases the surface roughness of a part of the bonding surface 51, which is welded to the ground electrode 17, of the chip 50. The bonding surface 51 of the chip 50 is pressed against the ground electrode 17 at the resistance welding. A welding-planned part 58 of the ground electrode 17 is a section against which the bonding surface 51 of the chip 50 is pressed on the ground electrode 17 at the resistance welding. Therefore, the welding-planned part 58 has the same size and the same shape as those of the bonding surface 51 of the chip 50. In the present embodiment, the bonding surface 51 of the chip 50 has a rectangular shape. The chip 50 is placed on the ground electrode 17 so that a long side of the bonding surface 51 is perpendicular to the axis 20 of the ground electrode 17.

In the machining process, the chip 50 is machined such that an area 54 located inside an edge 52 of the bonding surface 51 and including a center 53 of the bonding surface 51 is coarser or rougher than a section 57 except the area 54 of the bonding surface 51. The center 53 of the bonding surface 51 is an intersection of diagonal lines that connect vertexes of the bonding surface 51. In the present embodiment, a shape of the area 54 is similar to that of the bonding surface 51 of the chip 50. A method of roughening the area 54 is the same as that in the first embodiment. Therefore, its explanation will be omitted here.

When dividing the area 54 into two by a plane 25 that is perpendicular to the axis 20 of the ground electrode 17 and passes through a center 59 of the welding-planned part 58, one of the two is a first portion 55 at a side of the one end portion 18 connected to the metal shell 16 (see FIG. 2), and the other is a second portion 56 at a side of the other end portion 19 (see FIG. 2). A position of the center 59 of the welding-planned part 58 is the same as a position of the center 53 of the bonding surface 51 of the chip 50 after a bonding process. In the machining process, a location of the area 54 with respect to the center 53 of the bonding surface 51 is set such that an area of the first portion 55 is greater than that of the second portion 56.

In the bonding process, the chip 50 is placed on the welding-planned part 58 of the ground electrode 17, and the ground electrode 17 and the chip 50 (called bonding members) are sandwiched between the first electrode 43 and the second electrode 44 (see FIG. 5). Before current application, the bonding members are pressed by the first electrode 43 and the second electrode 44. After the pressing becomes stable, the current is applied between the first electrode 43 and the second electrode 44. Since current has a tendency to expand or spread once in the bonding members due to the fringing phenomenon, a current density tends to increase in the vicinity of the edge 52 of the bonding surface 51.

However, the chip 50 undergoes the machining process such that the area 54 located inside the edge 52 of the bonding surface 51 and including the center 53 of the bonding surface 51 is coarser or rougher than the section 57 except the area 54 of the bonding surface 51. Therefore, a contact resistance of the area 54 can be higher than that of the section 57. As a consequence, in an early current application, the current density of the area 54 including the center 53 of the bonding surface 51 increases, and temperature of the area 54 starts to rise. Subsequently, the temperature of the area 54 further increases, and temperature of the section 57 around the area 54 also increases. When temperatures of the area 54 and the section 57 exceed melting points of the bonding members, the bonding members start to be melted, and a melting area extends by and according to a charging amount of heat, i.e. with increase in an amount of current and a current application time. When stopping the current application, the melting area solidifies, and a nugget formed by melt and solidification of the chip 50 and the ground electrode 17 is formed.

As described above, in the bonding process, in the early current application, the density of the current passing through the roughly-machined area 54 including the center 53 of the bonding surface 51 of the chip 50 and the ground electrode 17 can be high. It is consequently possible to increase the temperature of the bonding members (the chip 50 and the ground electrode 17) from the area 54 including the center 53 of the bonding surface 51 of the chip 50 and extend the melting area without increasing the amount of current flowing through the first electrode 43 and the second electrode 44. Therefore, in the same manner as the first embodiment, the occurrence of scattering (the scattering of the molten metal) can be suppressed, and a bonding strength at a middle of the bonding surface 51 of the chip 50 can be secured.

Although the present invention has been explained on the basis of the above embodiments, the present invention is not necessarily limited to the above embodiments, and the present invention can be modified within technical ideas of the present invention.

In the above embodiments, the case where the chip 30 has a cylindrical column shape and the bonding surface 31 is circular in shape and also the case where the chip 50 has a rectangular parallelepiped shape and the bonding surface 51 is rectangular in shape are explained. However, the shapes of the chip and the bonding surface are not necessarily limited to these shapes, but can be arbitrarily set. In a case where the shapes of the chip and the bonding surface are arbitrarily set, the centers of the bonding surface and the welding-planned part coincide with centers of gravity of plane figures of the bonding surface and the welding-planned part respectively.

In the above embodiments, the case where the roughly-machined areas 26 and 54, which are a part of the welding-planned part 22 of the ground electrode 17 and a part of the bonding surface 51 of the chip 50, are similar to the welding-planned part 22 and the bonding surface 51 respectively are explained. However, the shapes and the sizes of the areas 26 and 54 are not limited to these shapes and sizes. The shapes and the sizes of the areas 26 and 54 can be properly set according to conditions of the pressing force and the amount of current at the current application of the resistance welding.

In the above embodiments, the case where the plating layer 21 formed on the ground electrode 17 is removed before the metal shell 16 to which the ground electrode 17 is connected is secured to the insulator 11 is explained. However, a removal order of the plating layer 21 is not necessarily limited to this order. As a matter of course, the plating layer 21 formed on the ground electrode 17 can be removed after the metal shell 16 to which the ground electrode 17 is connected is secured to the insulator 11.

In the above embodiments, the case where the plating layer 21 covering the ground electrode 17 is chemically removed by soaking a top end side of the ground electrode 17 in the stripping solution (not shown) and the case where the plating layer 21 covering the ground electrode 17 is removed by the physical removing method such as the ion etching and the shot blasting are explained. However, the removing method of the plating layer 21 is not necessarily limited to these methods. As a matter of course, the plating could be performed after masking a top end portion of the ground electrode 17 with a rubber tube etc. In this case, since the top end portion (including the welding-planned parts 22 and 58) of the ground electrode 17 is not in contact with plating solution by the mask, the plating layer 21 is formed at a portion except at least the welding-planned parts 22 and 58.

In the above embodiments, the case where the plating layer 21 is formed on the metal shell 16 and the ground electrode 17 by barrel-plating the metal shell 16 to which the ground electrode 17 is connected is explained. However, an order of the connection of the ground electrode 17 and the plating is not necessarily limited to this order. The plating layer 21 could be formed on the metal shell 16 before the ground electrode 17 is connected by rack plating of barrel plating, then the ground electrode 17 where the plating layer 21 is not formed could be connected to the metal shell 16. In this case, a removing work of the plating layer 21 formed on the ground electrode 17 is not required. Here, as a matter of course, the chips 30 and 50 could be bonded to the plating layer 21 formed on the ground electrode 17, although this explanation is omitted in the above embodiments.

In the above embodiments, the case of a direct-type resistance welding, in which the chips 30 and 50 are placed on the welding-planned parts 22 and 58 of the ground electrode 17 respectively and the current is applied between the first electrode 43 and the second electrode 44 with back surfaces of the welding-planned parts 22 and 58 of the ground electrode 17 being in contact with the first electrode 43 and with the chips 30 and 50 being in contact with the second electrode 44, is explained. However, the resistance welding is not necessarily limited to the direct-type resistance welding.

For instance, an indirect-type resistance welding, in which the chips 30 and 50 are placed on the welding-planned parts 22 and 58 of the ground electrode 17 respectively and the current is applied between the first electrode 43 and the second electrode 44 with the chips 30 and 50 being in contact with the second electrode 44 and with respective surfaces positioned on the same surfaces of the welding-planned parts 22 and 58 of the ground electrode 17 being in contact with the first electrode 43, could be employed. It is noted that shapes and sizes of the first electrode 43 and the second electrode 44 can be properly set.

In the above embodiments, the case where the ground electrode 17 connected to the metal shell 16 is bent is explained. However, a shape of the ground electrode 17 is not necessarily limited to this shape. As a matter of course, instead of the curved ground electrode 17, a linear ground electrode can be used. In this case, the linear ground electrode is connected to the metal shell 16, and the ground electrode faces the center electrode 13.

In the above embodiments, the case where the ground electrode 17 is set so that the chips 30 and 50 face the center electrode 13 in the axis O direction is explained. However, a position relationship between the ground electrode 17 and the center electrode 13 is not necessarily limited to this position relationship, but can be properly set. As the position relationship between the ground electrode 17 and the center electrode 13, for instance, the ground electrode 17 could be set so that a side surface of the center electrode 13 (the chip 14) and the chips 30 and 50 face each other. In this case, the welding-planned parts 22 and 58 are provided at an end surface of the ground electrode 17, and the chips 30 and 50 are welded to the welding-planned parts 22 and 58 respectively.

EXPLANATION OF REFERENCE

10 . . . spark plug
17 . . . ground electrode
18 . . . one end portion
19 . . . the other end portion
20 . . . axis
21 . . . plating layer
22, 58 . . . welding-planned part
23 . . . edge of welding-planned part
24, 59 . . . center of welding-planned part
25 . . . plane
26 . . . area
27 . . . first portion
28 . . . second portion
29 . . . section except area
30, 50 . . . chip
31, 51 . . . bonding surface
41 . . . laser beam
42 . . . oxide film
52 . . . edge of he bonding surface
53 . . . center of bonding surface
54 . . . area
55 . . . first portion
56 . . . second portion
57 . . . section 57 except area

What is claimed is:

1. A method of manufacturing a spark plug, the spark plug having a ground electrode to which a bonding surface of a chip is welded, the method comprising:
    a machining process of machining the ground electrode such that an area located inside an edge of a welding-planned part where the chip is welded on the ground electrode and including a center of the welding-planned part is rougher than a section except the area of the welding-planned part; and
    a bonding process of bonding the chip to the welding-planned part of the ground electrode having undergone the machining process by resistance welding.

2. The method of manufacturing the spark plug as claimed in claim 1, wherein:
    the spark plug has a metal shell,
    one end portion of the ground electrode is connected to the metal shell, and the chip is welded to the other end portion of the ground electrode, and
    when dividing the area into two of a first portion at a side of the one end portion and a second portion at a side of the other end portion by a plane that is perpendicular to an axis extending from the one end portion toward the other end portion of the ground electrode and passes through the center of the welding-planned part or the center of the bonding surface having undergone the bonding process, an area of the first portion is greater than that of the second portion.

3. The method of manufacturing the spark plug as claimed in claim 1, wherein: the machining process has:
    a first process of roughening the area by irradiating the area with laser beam; and
    a second process of removing an oxide film formed in the first process by irradiating the oxide film with laser beam having a smaller power than that in the first process.

4. The method of manufacturing the spark plug as claimed in claim 1, wherein: when undergoing the bonding process, at least the welding-planned part on the ground electrode has no plating layer on the welding-planned part.

5. A method of manufacturing a spark plug, the spark plug having a ground electrode to which a bonding surface of a chip is welded, the method comprising:
- a machining process of machining the chip such that an area located inside an edge of the bonding surface of the chip and including a center of the bonding surface is rougher than a section except the area of the bonding surface; and
- a bonding process of bonding the bonding surface of the chip having undergone the machining process to a welding-planned part where the chip is welded on the ground electrode by resistance welding.

6. The method of manufacturing the spark plug as claimed in claim 5, wherein:
the spark plug has a metal shell,
one end portion of the ground electrode is connected to the metal shell, and the chip is welded to the other end portion of the ground electrode, and
when dividing the area into two of a first portion at a side of the one end portion and a second portion at a side of the other end portion by a plane that is perpendicular to an axis extending from the one end portion toward the other end portion of the ground electrode and passes through the center of the welding-planned part or the center of the bonding surface having undergone the bonding process, an area of the first portion is greater than that of the second portion.

7. The method of manufacturing the spark plug as claimed in claim 5, wherein: the machining process has:
- a first process of roughening the area by irradiating the area with laser beam; and
- a second process of removing an oxide film formed in the first process by irradiating the oxide film with laser beam having a smaller power than that in the first process.

8. The method of manufacturing the spark plug as claimed in claim 5, wherein: when undergoing the bonding process, at least the welding-planned part on the ground electrode has no plating layer on the welding-planned part.

* * * * *